(12) United States Patent
Shiau

(10) Patent No.: US 7,545,540 B2
(45) Date of Patent: Jun. 9, 2009

(54) METHOD AND SYSTEM FOR PROCESSING COLOR IMAGE DATA

(75) Inventor: Jeng-nan Shiau, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 664 days.

(21) Appl. No.: 11/155,982

(22) Filed: Jun. 17, 2005

(65) Prior Publication Data

US 2006/0268344 A1 Nov. 30, 2006

Related U.S. Application Data

(60) Provisional application No. 60/685,120, filed on May 27, 2005.

(51) Int. Cl.
*H04N 1/40* (2006.01)
*H04N 1/46* (2006.01)
*H04N 1/60* (2006.01)

(52) U.S. Cl. ............... 358/3.22; 358/3.21; 358/525; 358/1.9

(58) Field of Classification Search ........... 358/1.9, 358/3.06, 500, 529, 523, 3.21, 3.22, 525; 382/165
See application file for complete search history.

(56) References Cited

U.S. PATENT DOCUMENTS

| | | | |
|---|---|---|---|
| 6,035,058 A | 3/2000 | Savakis et al. | |
| 6,757,426 B2 | 6/2004 | Link et al. | |
| 6,917,445 B2 * | 7/2005 | Kuno et al. | 358/1.9 |
| 7,009,739 B1 * | 3/2006 | Lin et al. | 358/500 |
| 2002/0168102 A1 | 11/2002 | Lee et al. | |
| 2002/0176105 A1 * | 11/2002 | Kawai et al. | 358/1.9 |
| 2003/0063803 A1 | 4/2003 | Lin et al. | |
| 2004/0042657 A1 | 3/2004 | Barton | |
| 2004/0114185 A1 | 6/2004 | Shiau et al. | |
| 2004/0228526 A9 * | 11/2004 | Lin et al. | 382/165 |

\* cited by examiner

*Primary Examiner*—Mark K Zimmerman
*Assistant Examiner*—Fan Zhang
(74) *Attorney, Agent, or Firm*—Maginot, Moore & Beck LLP

(57) ABSTRACT

A system and method remove at least one color from a color image in a chrominance-luminance color space. The processing method includes generating screen values for machine independent color space image pixels, comparing the screen values for the pixels with pixel values for one component of the machine independent color space, and generating a dropout pixel for each pixel having a screen value that is less than the pixel value for the one component of the machine independent color space. The screen value for a pixel may be compared to the pixel value for the luminance component to determine whether to generate a dropout pixel or not.

9 Claims, 2 Drawing Sheets

METHOD AND SYSTEM FOR PROCESSING COLOR IMAGE DATA

This application claims the benefit of Provisional Patent Application Ser. No. 60/685,120 filed on May 27, 2005 and entitled "Method And System For Processing Color Image Data."

TECHNICAL FIELD

The present invention relates generally to color image data processing systems, and more particularly, to systems performing color dropout on color image data.

BACKGROUND

In document image processing, many applications require the extraction of textual information from an image that has color content in the background. Removing colored backgrounds in some documents is useful in specific applications, such as forms processing. In some forms, colored backgrounds are provided for different data fields to facilitate data entry. Retention of the color data obtained in scanning is unnecessary for subsequent data processing. Therefore, removing the colored backgrounds, also known as color dropout, in such documents reduces the image file size, eliminates extraneous information, and simplifies the task of extracting textual information from the image for a processing system.

One application where color dropout is important is in the field of optical character recognition (OCR). Electronic color form dropout helps eliminate the lines and colors surrounding the text of interest so the character forms may be more readily recognized by the optical character recognition (OCR) application. In the OCR process, a document is scanned electronically, which converts the data on the form to a digital image. This digital image data may then be processed to remove background information, such as boxes and instructions for completing the form. One aspect of removing the background information may include color dropout for color forms or forms have color encoded data fields.

A scanning system typically generates a digital image file with three color components, such as red, green and blue ("RGB"). The number of pixels in the color image depends on the resolution of the scanning components. The numerical value at each pixel of a color component represents the density of the particular color component for a corresponding pixel.

One way of removing pixels of a particular color is to use an optical filter during scanning. The filter effectively blocks the color that matches the optical filter so that particular color appears white to the scanner. Any printing in black or any color other than the filter color is captured by the scanner. While this system is able to dropout a color from a document, it requires different filters for different colors and only one color can be filtered in a scan.

Systems are also known that process the digital image data generated by a document scan to dropout certain colored pixels. One such system is the one disclosed in U.S. Pat. No. 6,035,058, which issued to Savakis, et al. on Mar. 7, 2000. This type of system compares a measured distance between a point in a color space and a non-dropout color to a minimum threshold and determines whether a pixel should be white or black. One limitation of this type of system is the inability of the system to dropout shades of colors. Consequently, artifacts of a color background may arise from the incomplete removal of color that appears in slightly different shades during a scan. The different shades may arise from the quality of the document scanned or from fringe effects or the like during scanning.

Dropout color processing is also performed in monochrome printers that convert color documents before printing them in either black and white or grayscale. Such systems typically convert the color image data to a chrominance-luminance color space and then compare the converted data to preset thresholds to determine whether to print the pixel as a white, black, or grayscale pixel. The image data processors in these types of printers do not detect shades of colors well.

SUMMARY

A processing method addresses the need for detecting and removing shades of one or more dropout colors from a document image scan. The method includes generating a screen value and a threshold for each saturated color screen in a plurality of saturated color screens, receiving machine independent color space image pixels, generating screen values for the pixels from pixel values for two components of the machine independent color space and a set of screen values selected from the screen values for the plurality of saturated color screens, comparing the generated screen values to pixel values for a third component of the machine independent color space, and generating a dropout pixel for each pixel having a generated screen value that is less than the pixel value for the third component of the machine independent color space.

The method may be performed on image data in a chrominance-luminance space and implemented with a color texture function, such as those provided in some monochrome printers, for example. Such a color texture function includes a neutral color screen and six color texture screens. In the method and system described herein, the neutral color screen is located at the origin of the machine independent color space and the six color texture screens may be positioned at a distance from the origin that corresponds to the threshold associated with a color screen. The six color texture screens represent saturated color screens for the boundaries of the primary colors. Additionally, the angular position of one or more saturated color screens may be modified to correspond to particular hues for a color. A screen value is also set for each saturated color screen and the neutral color screen. The screen value may be set at a relatively low or high value, for example, to convert most or a few pixels of the corresponding color, respectively, to the dropout value.

Dropout pixels are generated in the chrominance-luminance color space with reference to a comparison of a screen value generated for a pixel and the luminance value for the pixel. The screen value is a hue and chrominance dependent parameter that reflects the screen values for the saturated color screens whose hue angles bound the pixel. For pixels having a chrominance value that is equal to or less than the threshold for the neutral color screen, the luminance value for the pixel is compared to the screen value for the neutral color screen. If it is less than the neutral color screen value, the black or grayscale value of the pixel is generated. If the luminance value is equal to or greater than the screen value for the neutral color screen, then the dropout value is generated.

For pixels having a chrominance value that is equal to or greater than the threshold for one of the saturated color screens, the luminance value for the pixel is compared to the screen value for the saturated color screen. If it is less than the saturated color screen value, the black or grayscale value of the pixel is generated. If the luminance value is equal to or greater than the screen value for the saturated color screen value, then the dropout value is generated.

For those pixels having a chrominance value that is between the threshold for the neutral color screen and one of the thresholds for the saturated color screens, an intermediate saturated color screen value is generated for the pixel's hue angle, if the pixel is not on one of the hue angles on which a saturated color screen value is defined. The intermediate saturated color screen value is generated by interpolating a value from the screen values for the two adjacent saturated color screens. The saturated color screen value for the hue angle of the pixel is blended with the neutral color screen value to generate a screen value for the pixel. If the luminance value for the pixel is less than the generated screen value, a black or grayscale value for the pixel is generated. If the luminance value of the pixel is equal to or greater than the generated screen value, then the dropout value is generated. The generation of the screen value includes a weighting factor that corresponds to the chrominance of the pixel, for example.

A system for detecting and removing a color from a machine independent color space image includes a screen value generator for generating screen values for machine independent color space image pixels, a comparator for comparing screen values for the pixels with pixel values for one component of the machine independent color space, and a dropout pixel generator for generating a dropout pixel for each pixel having a screen value that is less than the pixel value for the one component of the machine independent color space.

The above described features and advantages, as well as others, will become more readily apparent to those of ordinary skill in the art by reference to the following detailed description and accompanying drawings.

BRIEF DESCRIPTION OT THE DRAWINGS

DETAILED DESCRIPTION

Figure 1:
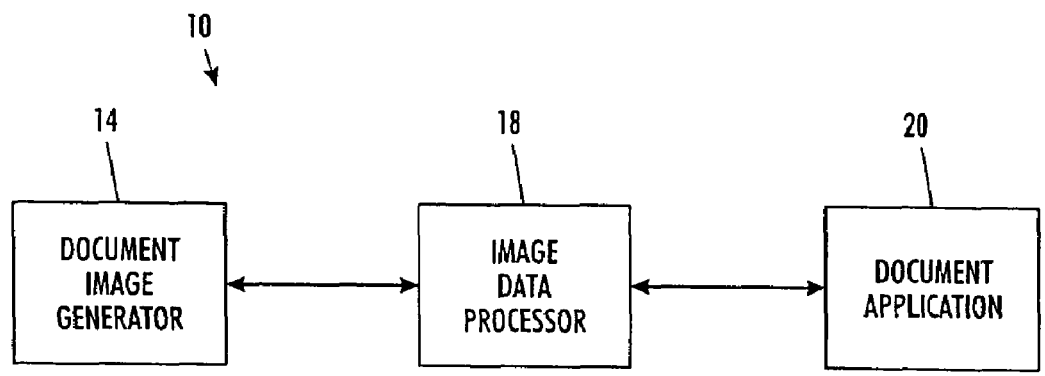
FIG. 1 is a block diagram of a system that generates color image data and processes the data for a document application.

FIG. 1 shows a system 10 that may be used to generate and process color image data. The system 10 includes a document image generator 14, an image data processor 18, and a document application 20. The document image generator 14 may be a document scanner or the like that generates a document image by illuminating a document on a platen and generating color signals responsive to the light reflected by the document. The generated data may be provided to an image data processor 18 that filters and otherwise processes the data for a document application. The image data processor 18 may be a component of the document image generator 14 or it may be a separate system that is coupled to the document image generator 14 for the receipt of image data. Likewise, the document application may execute in the same system as the image data processor 18 or it may reside in another processing system that is coupled to the image data processor 18. The image data processor 18 may provide parameters to the document image generator 14 to adjust the generation of the image data. Likewise, the document application 20 may provide parameters to the image data processor 18 to adjust the processing of the image data before it is provided to the document application.

FIG. 1 may also be understood as depicting a document application 20 that generates color documents. The color documents are processed by an image data processor 18 that may be associated with the computer on which the document application is executing, its own computer, or the processor associated with a monochrome printer that may be represented by the document image generator 14. In this scenario, the color data of the document is being processed so the printer may generate an image of the document on a substrate without color.

One of the functions that an image data processor 18 may perform is a dropout function. When color scans are converted to black and white images for document data processing, each color pixel must be mapped to either a white or a black pixel value. Before a color image is converted to a black and white image it may be converted from the machine dependent color space of the document image generator 14 to a machine independent color space. One common machine dependent color space is the RGB color space and a common machine independent color space is a chrominance-luminance (YCrCb) or a CIE-LAB color space. The calculations for converting from one machine dependent color space to a machine independent color space and vice versa are well known.

Previously known image data processors that perform a dropout function may use machine independent color space data for the function. These systems measure a distance between points in a chrominance-luminance color space and compare the measured distance to a threshold to determine whether a color pixel should be converted to a dropout value, which is typically the white pixel value, or the black pixel value. While these systems are somewhat effective, they may be confused by shade variations of color pixels. These shade variations are not perceptible in the luminance component that may dominate the distance measurement computation.

Figure 2:
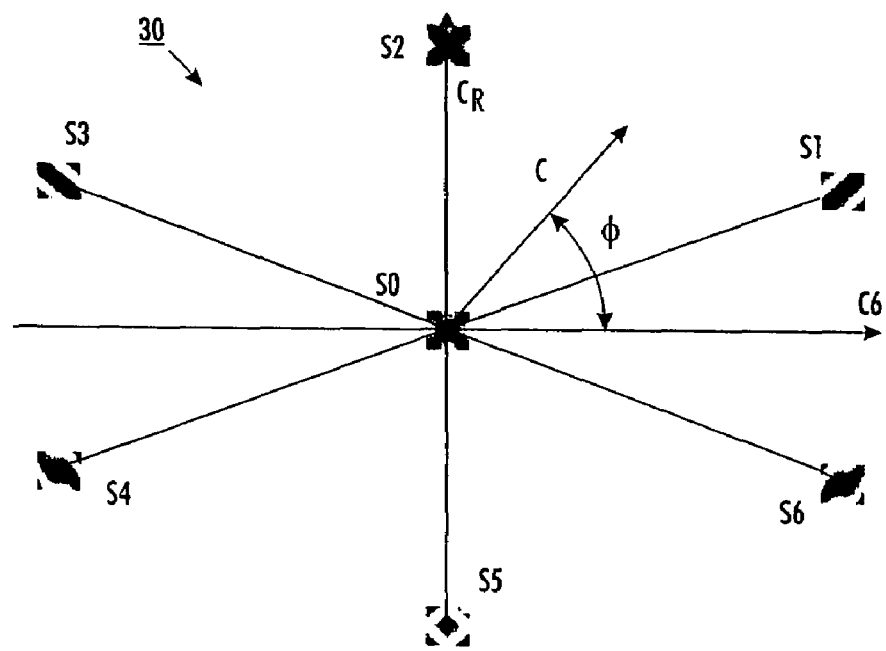
FIG. 2 is a depiction of an example of a relationship between a machine independent color space and the screens of a color texture function used for dropout color processing.

Image data processors have been developed that convert machine dependent data, such as RGB data, into machine independent data, such as CIE-LAB or YCrCb, and then screen the data to retain textures in the image, even though color is no longer present. An illustrative color to texture function with its texture screens is shown in FIG. 2. Imposed on a chrominance-luminance space 30 are six texture screens S1 to S6 and a texture neutral screen S0. A method and system may use this structure with some modification to perform a color dropout function.

By generating luminance screen values and a chrominance threshold for the texture neutral screen S0, the pixels having a low chrominance value that should be output as grayscale or black pixels may be identified. Machine independent color space pixels having a chrominance that is equal to or less than the chrominance threshold of the neutral color screen are compared to the neutral color screen values. Specifically, the pixels having luminance values that are less than a luminance screen value for the neutral color screen are output at their grayscale value or as a black pixel. Those pixels having luminance values that are equal to or greater than the screen value for the neutral color screen value are output as dropout pixels. For a chrominance-luminance color space, the threshold value for the neutral color screen is selected to be a relatively small distance from the origin. The screen value is selected to be relatively high so that most of the low chrominance pixels are printed.

Each of the remaining texture screens is associated with a spatially constant high or low screen value. By assigning a low value to a texture screen, most of the pixels on the hue angle for the screen are converted to white dropout pixels. A high screen value enables more of the pixels to be output as a grayscale or black pixel. A constant screen value is also assigned to each color screen, which may be called a saturated color screen because it represents a saturated color boundary. In a color texture function, these texture screens are equally spaced in the color space and are located at the angles corresponding to the primary colors as they are represented in the hue-chrominance-luminance color space. In the example shown in FIG. 2, the saturated color screens are located at the 30°, 90°, 150°, 210°, 270°, and 330° hue angles.

To further enhance hue evaluation in the dropout function, the angular position of these screens may be programmed at different positions. This ability to modify the position of the color screens facilitates the implementation of a non-dropout color. To implement a non-dropout color, the saturated color screen angle may be located to correspond to the hue range for a color. By selecting high screen values for the saturated color screen at these saturated color screen angle, most of the pixels are generated as grayscale or black pixels. Likewise, by selecting low screen values, most of the pixels are generated as white dropout pixels.

Hue describes color change in the chrominance-luminance color space. The hue is defined by an angle from the positive Cb axis to the chrominance C, for example, as shown in FIG. 2. The chrominance value is described by the radial distance C for a color from the origin. Thus, chrominance and hue act as polar coordinates for a point in the chrominance-luminance space. Luminance corresponds to the axis coming out of the page for FIG. 2. In the system and method described herein, the hue is evaluated in the dropout function as well as the luminance and chrominance.

Pixels having a chrominance that is between the threshold for the neutral color screen and a threshold for one of the saturated color screens, require the generation of an intermediate saturated color screen for the hue angle on which the pixel is located. This intermediate saturated color screen or saturated hue-dependent color screen may be generated by an interpolation between the pair of adjacent saturated color screen values. For the pixel C in FIG. 2, the two adjacent saturated color screen values are S1 and S2. The interpolation for generating a saturated hue-dependent color screen may be defined as:

$$S\_Hue(\phi) = (1-\acute{\alpha})*S_n + \acute{\alpha}*S_{n+1}$$

where $\acute{\alpha} = (\phi - \phi_n)/(\phi_{n+1} - \phi_n)$, $S_n$ is a screen value for a first color saturated color screen of a pair of adjacent saturated color screens, $S_{n+1}$ is a screen value for a second color saturated color screen of the pair of adjacent saturated color screens; $\phi$ is the hue angle for the saturated hue-dependent color screen, $\phi_n$ is the hue angle for the first saturated color screen, and $\phi_{n+1}$ is the hue angle for the second saturated color screen.

For pixels having a chrominance between the threshold for the neutral color screen and the threshold for one of the saturated color screens, a screen value is generated. The screen value includes a blending of the saturated screen value on the hue angle for the pixel and the neutral color screen value. For the pixel shown in the example of FIG. 2, this blending to generate the screen value is calculated by:

$$screen(\phi, C_x) = (1 - W(C_x))*S_0 + W(C_x)*S\_Hue(\phi),$$

where $screen(\phi, C_x)$ is the screen value for a chrominance value $C_x$ at the hue angle $\phi$, S0 is the screen value for the neutral color screen, $S\_Hue(\phi)$ is the saturated color screen value at a hue angle between $\phi_n$ and $\phi_{n+1}$, $C_x$ is a chrominance value of a pixel having a hue angle $\phi$, and $W(C_x)$ is a weighting value dependent on the chrominance value of the pixel. When the pixel is on one of the hue angles $\phi_n$ and $\phi_{n+1}$, $S_{13}$ Hue($\phi$) is the screen value for the corresponding saturated color screen. In the example of FIG. 2, $\phi_n$ is the hue angle for S1, $\phi_{n+1}$ is the hue angle for S2, and $S\_Hue(\phi)$ is computed as noted above. The weights for the $W(C_x)$ function vary from 0 to 1 in accordance with the chrominance of the pixel. The weighting function may be implemented as a lookup table whose coordinates for an entry are the Cr and Cb values for a pixel's chrominance. The screen value for a pixel on the hue angle $\phi$ is then compared to the luminance value for the pixel. If the luminance value is less than the screen value for a pixel, the corresponding grayscale or black pixel is generated for that pixel, otherwise a white dropout value is generated.

Figure 3:
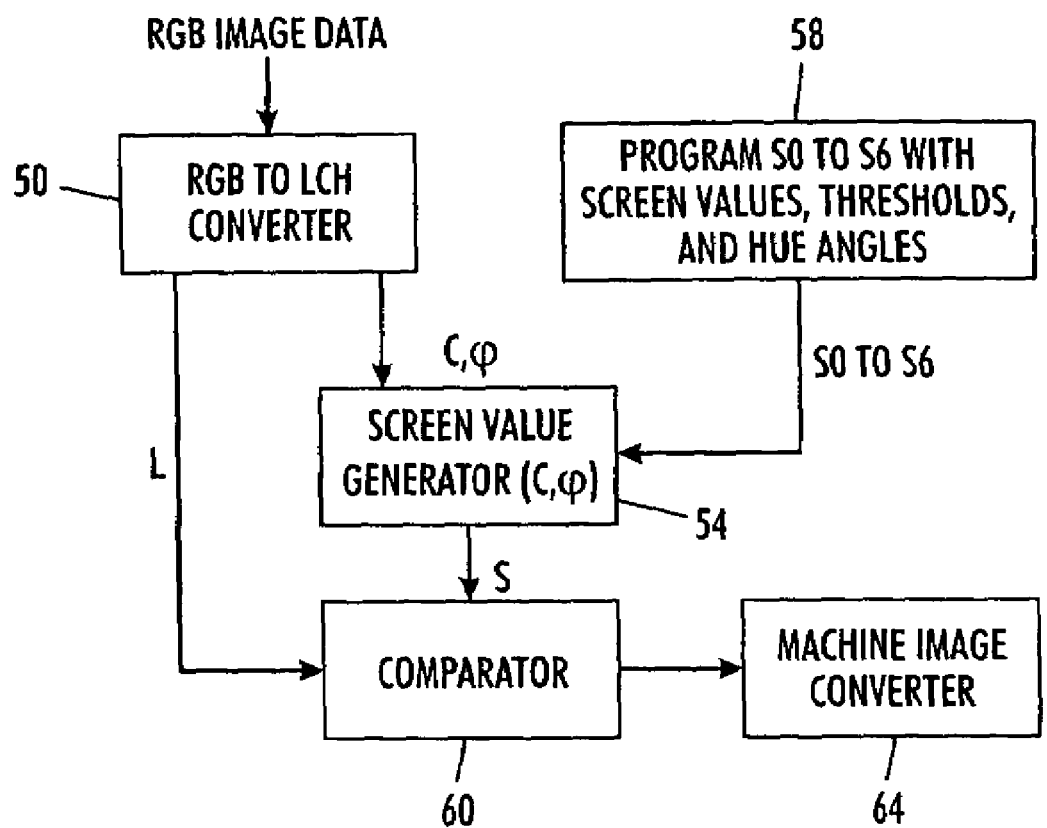
FIG. 3 is a block diagram showing the flow of data through a system implementing a method for generating dropout pixels for a color in a machine independent color space.

The data flow through a system performing a dropout function with image data in a machine independent color space is shown in FIG. 3. The machine dependent RGB color space data are converted to a machine independent hue-chrominance-luminance color space data (block 50). The pixel values for two of the machine independent color space components, chrominance and hue angle in this example, are provided to the screen value generator (block 54). A color screen generator (block 58) generates screen values, hue angles, and thresholds for neutral color screen and the saturated color screens. The selection of these parameters may be set by an operator using a graphic user interface or the like in a known manner. The screen value generator uses the thresholds to select the appropriate screen values for the color screens S0 to S6, for example, for determining the type of pixel to output for pixels in the neutral color or saturated color range. For pixels having a chrominance between these two ranges, any necessary intermediate saturated color screens are generated and any blending performed for generation of screen values for the pixel values for the two components of the machine independent color space, as discussed above. These screen values S are provided to the comparator (block 60). The comparator compares the screen values to the luminance values for the pixels to determine whether the dropout value should be generated for the pixel. The comparator may include or provide its output to a dropout pixel generator for generating the appropriate dropout values. As shown in FIG. 3, the comparator 60 provides dropout pixels and image pixels to a machine image converter 64. Dropout pixels are pixels having a value that indicates a pixel corresponding to the background of an image is generated when the image is reproduced. Image pixels are black or grayscale pixels that are generated for machine independent color space pixels for which dropout pixels are not generated. The machine image converter 64 converts the dropout and image pixels into a machine dependent color space, such as a CYMK color space. The converted image may be provided to an electrostatographic printing system so the image may be electrostatographically printed.

The reader will appreciate that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for detecting and removing at least one dropout color from color image data in a machine independent color space comprising:

generating screen values and threshold values for a neutral color screen and each saturated color screen in a plurality of saturated color screens for a chrominance-luminance space;

receiving chrominance-luminance color space image pixels;

comparing a value for a chrominance and a value for a hue angle for each chrominance-luminance color space pixel to the threshold values for the neutral color screen and the saturated color screens to identify whether the chrominance-luminance color space pixel corresponds to one of the neutral color and saturated color screens;

interpolating an intermediate color screen in response to none of the neutral color and saturated color screens being identified as corresponding to the chrominance-luminance color space pixel, the interpolation of the intermediate color screen being computed as follows:

$(1-\acute{\alpha})*S_n + \acute{\alpha}*S_{n+1}$ where $\acute{\alpha}=(\phi-\phi_n)/(\phi_{n+1}-\phi_n)$, $S_n$ is a screen value for a first saturated color screen of a pair of saturated color screens, $S_{n+1}$ is a screen value for a second saturated color screen of the pair of saturated color screens; $\phi$ is a hue angle for the intermediate color screen, $\phi_n$ is a hue angle for the first saturated color screen, and $\phi_{n+1}$ is a hue angle for the second saturated color screen;

comparing a screen value for one of the identified neutral color screen, saturated color screen, and intermediate color screen to a corresponding value for a luminance component of the corresponding chrominance-luminance color space pixel;

generating a dropout pixel for each chrominance-luminance color space image pixel having a corresponding value for the luminance component of the chrominance-luminance color space pixel that is less than the screen value for the identified neutral color screen, saturated color screen, and intermediate color screen corresponding to the chrominance-luminance color space pixel;

generating a black image pixel or a grayscale image pixel for each chrominance-luminance color space image pixel having a corresponding value for the luminance component of the machine independent color space pixel that is greater than the screen value for the identified neutral color screen, saturated color screen, and intermediate color screen corresponding to the chrominance-luminance color space pixel;

converting the dropout pixels, black image pixels, and the grayscale image pixels generated with reference to the received chrominance-luminance color space pixels into machine dependent color space pixels; and printing the machine dependent color space pixels in the machine dependent color space with an electrostatographic printing system.

2. The method of claim 1, the generation of screen values and thresholds for the saturated color screens further comprising:

generating screen values and thresholds for six saturated color screens.

3. The method of claim 1, wherein the generation of screen values for the neutral color and saturated color screens generates screen values corresponding to a luminance value that is used to generate the dropout, black, and grayscale pixels.

4. The method of claim 1, the generation of the intermediate color screen comprises:

blending the interpolated color screen values with the neutral color screen values.

5. The method of claim 4, the blending of the interpolated color screen values with the neutral color screen values further comprises:

generating screen values for the intermediate color screen as follows:

$(1-W(C_x))*S_0 + W(C_x)*S\_Hue(\phi)$, where $S_0$ is the screen value for the neutral color screen, $S\_Hue(\phi)$ is the intermediate color screen at a hue angle $\phi$ between $\phi_n$ and $\phi_{n+1}$ and $C_x$ is a chrominance value of a pixel having a hue angle $\phi$ and $W(C_x)$ is a weighting value dependent on the chrominance value of the pixel.

6. A system for detecting and removing at least one dropout color from color image data in a machine independent color space comprising:

a color space image data converter configured to convert machine dependent color space pixels to chrominance-luminance color space pixels;

a screen value generator configured to generate a screen value and a threshold for one of a plurality of saturated color screens and a neutral color screen that corresponds to a chrominance value and a hue angle for one of the chrominance-luminance color space pixels or to generate a screen value for an intermediate color screen in response to a chrominance-luminance pixel having a hue angle and a chrominance between a hue angle and a chrominance for a first saturated color screen and a hue angle and a chrominance for a second saturated color screen by interpolating as follows:

$(1-\acute{\alpha})*S_n + \acute{\alpha}*S_{n+1}$ where $\acute{\alpha}=(\phi-\phi_n)/(\phi_{n+1}-\phi_n)$, $S_n$ is a screen value for the first saturated color screen of the pair of saturated color screens, $S_{n+1}$ is a screen value for the second saturated color screen of the pair of saturated color screens; $\phi$ is the hue angle for the interpolated color screen, $\phi_n$ is the hue angle for the first saturated color screen, and $\phi_{n+1}$ is the hue angle for the second saturated color screen;

a comparator configured to compare the screen value generated by the screen value generator with a luminance value for the chrominance-luminance color space pixel, the comparator outputting a black image pixel or a grayscale image pixel for the chrominance-luminance color space pixel in response to the screen value being greater than the luminance value for the chrominance-luminance color space pixel;

a dropout pixel generator for generating a dropout pixel for the chrominance-luminance color space pixel in response to the screen value being less than the luminance value for the chrominance-luminance color space pixel, the dropout pixels being in the chrominance-luminance color space;

a machine image converter for converting dropout pixels from the dropout pixel generator, and black image pixels and grayscale image pixels received from the comparator, into machine dependent color space pixels; and an electrostatographic printing system coupled to the machine image converter for electrostatographically printing the machine dependent color space pixels received from the machine image converter.

7. The system of claim 6 wherein the screen value generator blends the intermediate color screen value with a screen value for the neutral color screen to generate the intermediate screen value.

8. The system of claim 7 wherein the screen value generator blends the intermediate color screen value with the neutral color screen value as follows:

$(1-W(C_x))*S_0 + W(C_x)*S\_Hue(\phi)$, where $S_0$ the screen value for the neutral color screen, $S\_Hue(\phi)$ is the interpolated color screen at a hue angle ϕ between $\phi_n$ and $\phi_{n+1}$, and $C_x$ is a chrominance value of a pixel having a hue angle ϕ and $W(C_x)$ is a weighting value dependent on the chrominance value of the pixel.

9. The system of claim 6 wherein the machine image converter converts the chrominance-luminance color space dropout pixels, black image pixels, and grayscale image pixels into CYMK color space dropout pixels, CMYK black image pixels, and CYMK grayscale image pixels.

* * * * *